(12) United States Patent
Jaggi et al.

(10) Patent No.: US 8,139,359 B2
(45) Date of Patent: Mar. 20, 2012

(54) COOLING SYSTEM FOR A VARIABLE VACUUM CAPACITOR

(75) Inventors: Manuel Jaggi, Jegenstorf (CH); Walter Bigler, Heitenried (CH)

(73) Assignee: Comet AG, Flamatt (CH)

( * ) Notice: Subject to any disclaimer, the term of this patent is extended or adjusted under 35 U.S.C. 154(b) by 211 days.

(21) Appl. No.: 12/676,442

(22) PCT Filed: Sep. 10, 2007

(86) PCT No.: PCT/EP2007/059480
§ 371 (c)(1),
(2), (4) Date: Mar. 4, 2010

(87) PCT Pub. No.: WO2009/033501
PCT Pub. Date: Mar. 19, 2009

(65) Prior Publication Data
US 2010/0193160 A1    Aug. 5, 2010

(51) Int. Cl.
*H05K 7/20* (2006.01)
*H01G 5/00* (2006.01)
(52) U.S. Cl. .................. 361/700; 361/274.2; 361/699
(58) Field of Classification Search .......... None
See application file for complete search history.

(56) References Cited

U.S. PATENT DOCUMENTS

| 3,571,677 | A | * | 3/1971 | Oeschger | 361/279 |
| 4,428,025 | A | * | 1/1984 | King | 361/274.2 |
| 6,268,995 | B1 | * | 7/2001 | Beuerman et al. | 361/277 |
| 6,975,499 | B2 | * | 12/2005 | Takahashi et al. | 361/277 |
| 7,042,699 | B2 | * | 5/2006 | Takahashi et al. | 361/277 |

FOREIGN PATENT DOCUMENTS

| CH | 656740 A5 | 7/1986 |
| DE | 3806855 A1 | 10/1988 |
| JP | 08097084 A | 4/1996 |
| JP | 11074153 A | 3/1999 |

OTHER PUBLICATIONS

International Search Report from correspondmg Internationa Application PCT/EP2007/059480.

* cited by examiner

*Primary Examiner* — Boris Chervinsky
(74) *Attorney, Agent, or Firm* — WRB-IP LLP

(57) ABSTRACT

In a cooling system for a variable vacuum capacitor, a liquid is arranged inside a cooling reservoir, a first part of the reservoir is designed to absorb heat energy from first bellows of the variable vacuum capacitor, the first bellows being responsible for transporting electrical energy to a second electrode of the variable vacuum capacitor, a second part of the reservoir is designed to dissipate heat energy towards a cooling circuit, and heat pipes are arranged between the first part of the reservoir and the second part of the reservoir.

8 Claims, 2 Drawing Sheets

COOLING SYSTEM FOR A VARIABLE VACUUM CAPACITOR

BACKGROUND AND SUMMARY

The present invention relates to a cooling system for a variable vacuum capacitor.

In the prior art, for various purposes, fixed vacuum capacitors with a certain capacitance and variable vacuum capacitors with a capacitance that is adjustable within a certain range are used. Vacuum capacitors may be used in broadcast systems, in systems for the production of flat panel displays or semiconductors, or in other industrial applications. Vacuum as a dielectric medium offers many advantages. Because of the high dielectric strength, it is possible to maintain very close plate spacing and still have a capacitor with good high voltage capabilities. Should a breakdown occur in a vacuum capacitor, this does not normally result in permanent damage which is often the case with capacitors with other dielectrics, such as paper, $SF_6$, or other dielectrics. Variable vacuum capacitors often comprise a first electrode that, by means of a metal bellows, is movably arranged with respect to a first part of the housing of the variable vacuum capacitor. An insulator is tightly connected between the first part of the housing and the second part of the housing. The second part of the housing comprises a second electrode. A vacuum that extends between the first electrode and the second electrode is established inside the housing. With such an arrangement, a variable capacitor is established, wherein the capacitance of the variable capacitor depends on the distance between the first, movably arranged electrode and the second electrode. When such a variable vacuum capacitor is in use, electrical energy is transmitted over the metal bellows between the first part of the housing and the first electrode. The metal bellows has to be flexible enough to allow a smooth movement of the first electrode and, as well, the metal bellows has to be a good electrical conductor. However, these requirements are difficult to achieve at the same time. Therefore, when such a variable vacuum capacitor is used in high energy applications, excessive heat energy may be produced in the metal bellows. In prior art, water cooling systems have been used to provide a sufficient cooling of a variable vacuum capacitor. In the document CH656740, a turbulence water cooling system with a high efficiency is described. Water cooling systems are arranged such that a water stream is guided inside the metal bellows, thus enabling an efficient cooling of the metal bellows. A drawback of a water cooling system is that distilled or de-ionized water has to be used. Moreover, the water purity and flow protection should be periodically checked to insure against excessive degradation. Water purity can be seriously degraded by contaminants from the various cooling system components. For example, free oxygen and carbon dioxide in the coolant will form copper oxide on the surfaces, thereby reducing the cooling efficiency. Moreover, if a water cooled vacuum capacitor is not used for a certain time period, a complicated drying procedure has to be applied first, in order to avoid corrosion.

It is desirable to propose a new cooling system for a variable vacuum capacitor, which cooling system does not have the drawbacks of the prior art. In particular the new cooling system shall allow usage of conventional industrial water, and the risk of corrosion when the variable vacuum capacitor is not used for a certain time period shall be reduced.

In an aspect of the present invention a liquid is arranged inside a closed cooling reservoir, that a first part of the reservoir is designed to absorb heat energy from first bellows of the variable vacuum capacitor, said first bellows being responsible for transporting electrical energy to a first electrode of the variable vacuum capacitor, that a second part of the reservoir is designed to dissipate heat energy towards a cooling circuit, and that heat pipes are arranged between the first part of the reservoir and the second part of the reservoir. In particular, the cooling circuit can be easily designed in such a manner that conventional industrial water without any purification can be used. Moreover, the risk of corrosion in the cooling circuit is drastically reduced. For example, the cooling circuit can be manufactured in stainless steel material. Moreover, the drying procedure of the cooling circuit is simplified. For example, a simple drying by means of high pressure air may suffice.

In an embodiment variant, the liquid arranged inside the closed reservoir comprises oil. In particular, such an embodiment variant has the advantage that a relatively cheap liquid with appropriate thermal and electrical properties may be arranged in the cooling reservoir.

In another embodiment variant, the cooling circuit is manufactured in stainless steel material or in any other material resistive to corrosion and capable of transmitting heat energy at the same time. In particular, such an embodiment variant has the advantage that conventional industrial water may be used for heat energy transportation in the cooling circuit.

In another embodiment variant, the cooling circuit comprises means for dissipating heat energy to a surrounding. Such means may comprise any type of heat exchanging device. For example, a heat exchanging device may comprise several laminations for dissipating heat from a metal body to the air.

In another embodiment variant, orifices are arranged between the first part of the reservoir and the second part of the reservoir for enabling a free circulation of the liquid in the reservoir. For good heat energy absorption, the first part of the cooling reservoir has to be arranged close to the location where heat energy is generated. For good heat energy dissipation, the second part of the cooling reservoir has to be arranged close to a location where heat energy can easily be dissipated. Various constructional requirements have to be met when arranging the first part of the reservoir and the second part of the reservoir. It is an advantage, in particular, when orifices are arranged between the first and the second part of the reservoir; a free circulation of the liquid inside the reservoir can be established.

In another embodiment variant, second bellows are arranged for establishing a constant volume of the reservoir. It is an advantage, in particular, that, by means of the second bellows, a closed reservoir that can be fully filled with the liquid can be established.

In a further embodiment variant, the first bellows comprise metal material, in particular bronze or other alloys. It is an advantage, in particular, that materials with well known properties, especially concerning transmission of electrical energy, can be used.

In another embodiment variant, the second bellows comprise plastic material, in particular rubber or other flexible material. It is an advantage, in particular, that materials with well known properties, especially concerning mechanical flexibility, can be used.

BRIEF DESCRIPTION OF DRAWINGS

An embodiment of the present invention will be described in the following with reference to an example. The example of the embodiment is illustrated by FIG. 1 and FIG. 2.

DETAILED DESCRIPTION

Figure 1:
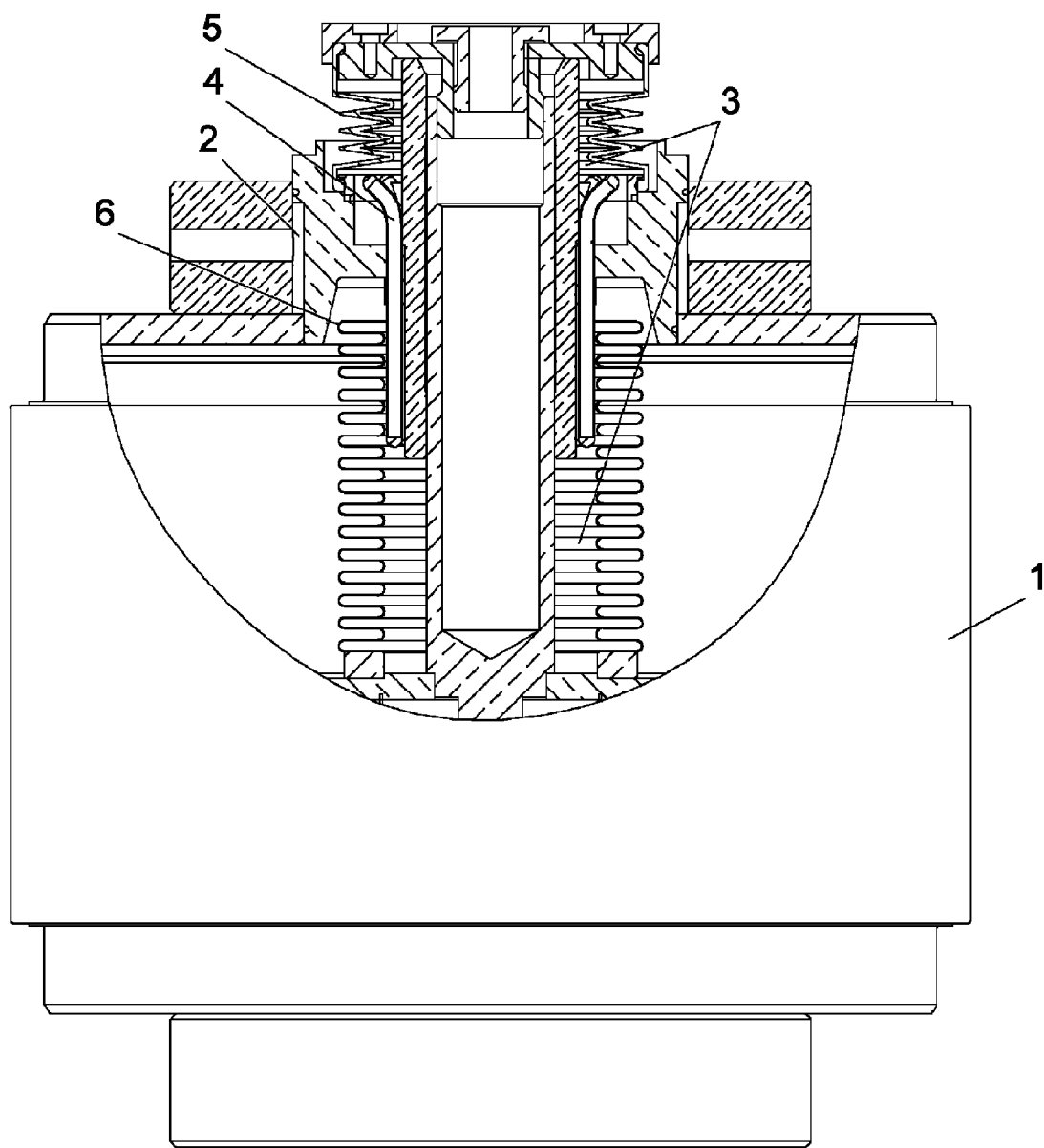
FIG. 1 shows a first embodiment of the present invention.

In FIG. 1, the reference numeral 1 refers to a variable vacuum capacitor. In particular, the variable vacuum capacitor comprises two electrodes which are electrically separated by means of an insulator and which are arranged inside a vacuum. In FIG. 1, the electrodes are not shown. In FIG. 1, a cooling system for a variable vacuum capacitor 1 is shown. In FIG. 1, the reference numeral 2 refers to a cooling circuit. The cooling circuit 2 is arranged outside the variable vacuum capacitor 1. The cooling circuit 2 may be a high pressure cooling circuit. The cooling circuit 2 may be designed to transport heat energy away from the outside of the variable vacuum capacitor. The transport of heat energy may be enforced by means of a suitable transportation of water. However, any other means for transporting heat energy away from the outside of the variable vacuum capacitor may be used. Such other means may comprise, for example, several laminations arranged on the surface of the variable vacuum capacitor 1. In the prior art, many solutions for a transportation of heat energy are known. When circulating water is used to enforce heat energy transportation, problems relating to corrosion of the materials may occur. Often, in order to avoid problems relating to corrosion, water purity requirements have to be fulfilled, and careful attention has to be paid to handling the devices involved. However, if the materials involved may be carefully chosen, as it is the case for the variable vacuum capacitor 1 according to FIG. 1, water purity requirements may become less important, and attention to handling the devices involved may be simplified. For example, such materials may involve stainless steel or other materials which are inert with respect to contact with water and which provide good heat energy transportation. In prior art, for variable vacuum capacitors, cooling circuits have been used which are based on a circulation of water inside the bellows of the variable vacuum capacitor. However, such a cooling circuit has the disadvantage that water purity requirements are very high, and that the devices involved have to be handled carefully. In FIG. 1, the reference numeral 3 refers to a cooling reservoir. In FIG. 1, the reference numeral 6 refers to first bellows. In particular, the first bellows 6 may be manufactured out of metal material. The cooling reservoir 3 is arranged inside the metal bellows 6 of the variable vacuum capacitor 1. The metal bellows 6 of the capacitor are used for a transportation of electrical energy to one of the electrodes of the capacitor. As well, the metal bellows 6 have the function to provide a separation plane between the vacuum inside the capacitor and the air outside the capacitor. Moreover, the metal bellows 6 have to be flexible enough, such that the electrode attached to the metal bellows 6 can be moved accordingly. The metal bellows 6 may be manufactured in bronze material, for example. When the electrode is moved, the volume of the metal bellows 6 is changed. Inside the cooling reservoir 3, a liquid may be arranged. Such a liquid may comprise any suitable oil. For example, synthetic oil with good heat energy transportation capabilities and good electrical capabilities may be arranged inside the reservoir 3. In FIG. 3, the reference numeral 5 refers to second bellows. The second bellows 5 may comprise plastic or rubber material. For example, the second bellows may be manufactured out of rubber material. The rubber bellows 6 are arranged such that a closed surface exists between the reservoir 3 and the outside of the variable vacuum capacitor. Therefore, as it is shown in FIG. 3, the cooling reservoir 3 comprises a first part arranged close to the metal bellows 6 and a second part arranged close to the rubber bellows 5. As it is shown in FIG. 1, in the centre of the metal bellows 6 and in the centre of the rubber bellows 5, means are arranged such that the electrode attached to the metal bellows 6 can be moved accordingly. Such means may comprise, essentially, a rod that is guided through an opening of the variable vacuum capacitor. The opening of the variable vacuum capacitor may comprise a mount for guiding the rod. The mount may comprise orifices such that a free movement and a free circulation of the liquid arranged in the reservoir 3 occur. With such a reservoir 3, heat energy which is generated in the metal bellows 6 can be absorbed into the liquid arranged in the reservoir. Heat energy may be transferred towards the rubber bellow 5, and this transferred heat energy may be further absorbed by means of the cooling circuit 2.

In FIG. 1, the reference numeral 4 refers to a heat pipe. The heat pipe 4 may comprise a sealed vessel containing a working fluid and its vapour, together with a capillary wick lining system. A heat pipe can be thought of as a super heat conductor, and can provide a heat energy transfer system that is capable of transporting large amounts of heat energy from one end to another end. The heat pipe 4 is arranged such that heat energy is transferred through the mount from the part of the reservoir 3 that is located near the metal bellows 6 to the part of the reservoir 3 that is located near the rubber bellows 5. By means of the heat pipe 4, large amounts of heat energy can be absorbed from a region near the metal bellows 6 to a region near the rubber bellows 5.

Figure 2:
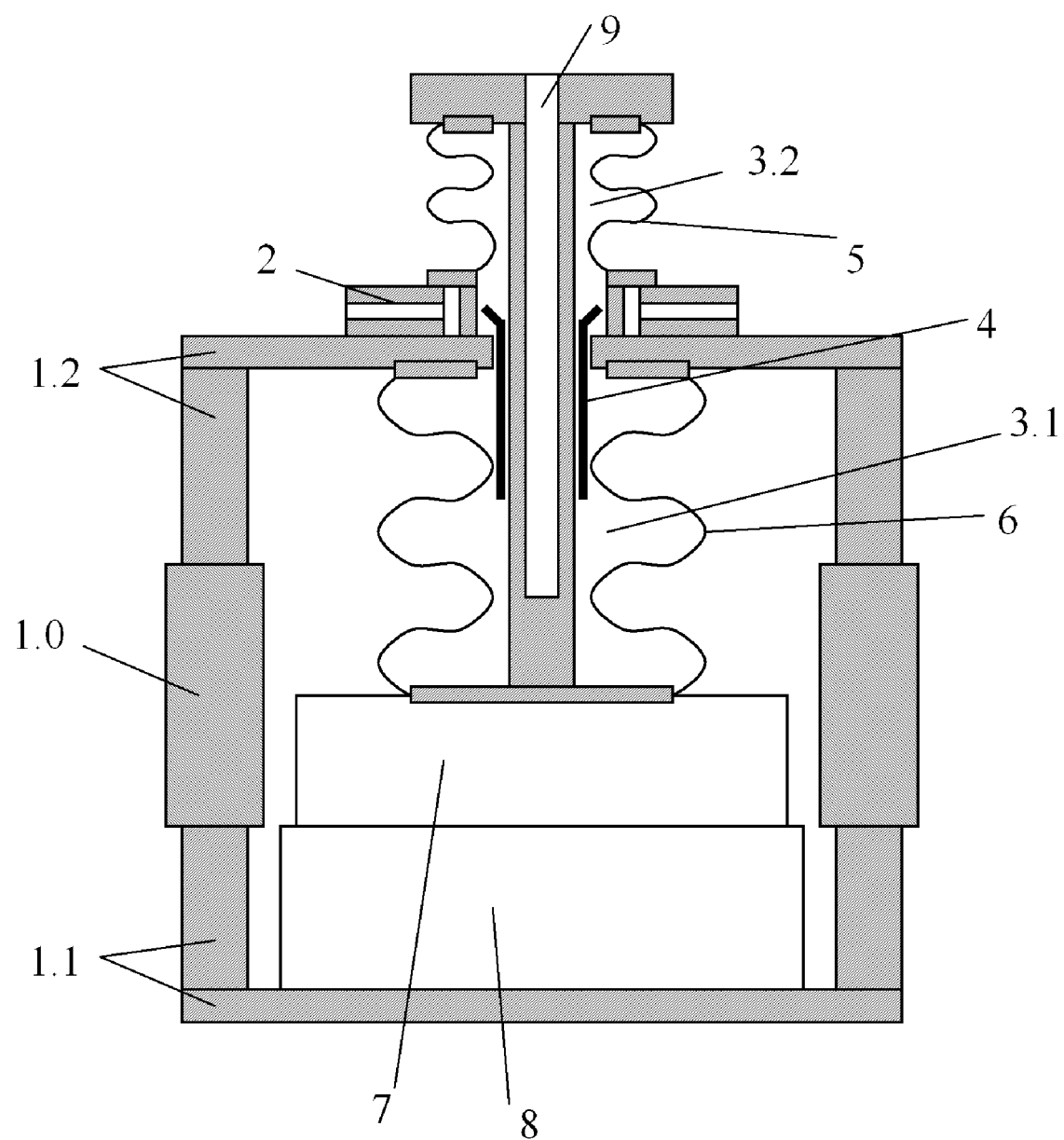
FIG. 2 shows schematically a variable vacuum capacitor according to the invention.

In FIG. 2, the reference numeral 1.0 refers to an insulator of the variable vacuum capacitor. For example, the insulator 1.0 is manufactured out of a ceramic material or any other insulating material. At a first end, the insulator 1.0 is attached to a first part of the housing 1.1 of the variable vacuum capacitor. At a second end, the insulator 1.0 is attached to a second part of the housing 1.2 of the variable vacuum capacitor. Inside the housing 1.1, 1.2 and the insulator 1.0, two electrodes are arranged. A first electrode 8 is attached to the first part of the housing 1.1. Metal bellows 6 are attached at one end to the second part of the housing 1.2. A second electrode 7 is attached to another end of the metal bellows 6. Inside the variable vacuum capacitor, a vacuum is established such that the vacuum exists between the first electrode 8 and the second electrode 7. The vacuum is separated from the outside of the variable vacuum capacitor by means of the bellow 6, the second part of the housing 1.2, the insulator 1.0 and the first part of the housing 1.1. In FIG. 2, the reference numeral 9 refers to a rod. The rod 9 is arranged inside the metal bellows 6, such that by means of external forces the second electrode 7 can be moved towards the first electrode 8 or away from the second electrode 7. The change of distance between the electrodes leads to a change of the capacitance of the variable vacuum capacitor. Electricity is fed to the first electrode 8 through the first part of the housing 1.1, from one side, and electricity is fed to the second electrode 7 through the second part of the housing 1.2 and through the metal bellows 6. In FIG. 2, the reference numeral 2 refers to a cooling circuit. The cooling circuit 2 may comprise tubes through which water can be circulated. Therefore heat energy can be transported away from areas where the cooling circuit 2 is arranged. In FIG. 2, the reference numeral 3.1 refers to a first part of a reservoir. The first part of the reservoir 3.1 is arranged close to the metal bellows 6. In FIG. 2, the reference numeral 3.2 refers to a second part of a reservoir. The second part of the reservoir 3.2 is arranged close to the cooling circuit 2. The first part of the reservoir 3.1 and the second part of the reservoir 3.2 are filled with a liquid, for example with oil or any other liquid with good heat transfer capabilities and appropriate electrical properties. Between the first part of the reservoir 3.1 and the second part of the reservoir 3.2, orifices may be arranged, such that the liquid in the reservoir can freely circulate between the two parts of the reservoir. In FIG. 2, the reference numeral 5 refers to rubber bellows. The rubber bellows 5 may be attached to the outside of the variable vacuum capacitor on one side and to the rod 9 on the other side.

By means of the rubber bellows 5, a closed reservoir is formed. When the rod 9 is moved in one or in the other direction, liquid is transported through the orifices between the two parts of the reservoir. In FIG. 2, the reference numeral 4 refers to a heat pipe. The heat pipe 4 is manufactured according to known technologies and is capable of transporting large amounts of heat energy. As it is shown in FIG. 2, several heat pipes 4 can be arranged. The heat pipe 4 is arranged such that heat energy is transported from the first part of the reservoir 3.1 to the second part of the reservoir 3.2. The cooling system according to the invention is based on heat transfer through the reservoir 3.1, 3.2 with a liquid, a heat transfer through the heat pipes 4, and a heat transfer through the cooling circuit 2. The reservoir 3.1 and 3.2 can be manufactured as a closed reservoir that does not need any maintenance. The cooling circuit 2 can be manufactured such that normal industrial water can be used as a cooling medium.

The invention claimed is:

1. Cooling system for a variable vacuum capacitor, wherein a liquid is arranged inside a cooling reservoir, that a first part of the reservoir is designed to absorb heat energy from first bellows of the variable vacuum capacitor, the first bellows being responsible for transporting electrical energy to a second electrode of the variable vacuum capacitor, that a second part of the reservoir is designed to dissipate heat energy towards a cooling circuit, that heat pipes are arranged between the first part of the reservoir and the second part of the reservoir, and that the cooling reservoir and the cooling circuit are separated.

2. Cooling system according to claim 1, wherein the liquid arranged inside the closed reservoir comprises oil.

3. Cooling system according to claim 1, wherein the cooling circuit manufactured in stainless steel material or in any other material resistive to corrosion and capable of transmitting heat energy at the same time.

4. Cooling system according to claim 1, wherein the cooling circuit comprises means for dissipating heat energy to a surrounding.

5. Cooling system according to claim 1, wherein orifices are arranged between the first part of the reservoir and the second part of the reservoir for enabling a free circulation of the liquid in the reservoir.

6. Cooling system according to claim 1, wherein second bellows are arranged for establishing a constant volume of the reservoir.

7. Cooling system according to claim 1, wherein the first bellows comprise metal material, in particular bronze or other alloys.

8. Cooling system according to claim 1, wherein the second bellows comprise plastic material, in particular rubber or other flexible material.

* * * * *